(12) United States Patent
Hong

(10) Patent No.: US 11,503,641 B2
(45) Date of Patent: Nov. 15, 2022

(54) METHOD AND DEVICE FOR PROCESSING CHANNEL ACCESS FAILURE IN UNLICENSED BAND

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 92 days.

(21) Appl. No.: 17/051,062

(22) PCT Filed: Aug. 26, 2019

(86) PCT No.: PCT/KR2019/010844
§ 371 (c)(1),
(2) Date: Oct. 27, 2020

(87) PCT Pub. No.: WO2020/045920
PCT Pub. Date: Mar. 5, 2020

(65) Prior Publication Data
US 2021/0235500 A1    Jul. 29, 2021

(30) Foreign Application Priority Data

Aug. 30, 2018  (KR) .................. 10-2018-0102907
Aug. 23, 2019  (KR) .................. 10-2019-0103888

(51) Int. Cl.
*H04W 74/08*    (2009.01)
*H04W 76/18*    (2018.01)

(52) U.S. Cl.
CPC ....... *H04W 74/0825* (2013.01); *H04W 76/18* (2018.02)

(58) Field of Classification Search
CPC ..... H04W 76/18; H04W 84/12; H04W 28/00; H04W 36/00; H04W 72/00; H04W 76/00;
(Continued)

(56) References Cited

U.S. PATENT DOCUMENTS 7,822,438 B2 * 10/2010 Parron .................. H04W 76/19
370/328
2015/0063223 A1 * 3/2015 Shen .................... H04W 52/265
370/329
(Continued)

FOREIGN PATENT DOCUMENTS

KR    20140143070 A  * 12/2014 ........... H04W 48/16
KR    20140143070 A  * 12/2014
(Continued)

OTHER PUBLICATIONS

Mediatek Inc. "Enhancements to the RACH procedure for NR-U", R2-1812343, 3GPP TSG-RAN WG2 Meeting #103, Gothenburg, Sweden, Aug. 20-24, 2018.
(Continued)

*Primary Examiner* — Dung Hong
(74) *Attorney, Agent, or Firm* — IP Legal Services, LLC

(57) ABSTRACT

Provided are methods and apparatus for performing communication in an unlicensed band. The method includes: detecting a channel occupation failure of an unlicensed band wireless resource for transmitting and receiving uplink data or downlink data; determining that channel access fails in the unlicensed band wireless resource if the channel occupation failure satisfies certain criteria; and transmitting upper layer signaling to a base station if channel access fails.

18 Claims, 12 Drawing Sheets

(58) Field of Classification Search
CPC ..... H04W 76/10; H04W 76/16; H04W 76/15; H04W 76/19; H04W 80/02
See application file for complete search history.

(56) References Cited

U.S. PATENT DOCUMENTS

| | | | |
|---|---|---|---|
| 2017/0094700 A1* | 3/2017 | Hong | H04W 76/12 |
| 2017/0311362 A1* | 10/2017 | Hong | H04W 16/10 |
| 2017/0332358 A1 | 11/2017 | Park et al. | |
| 2018/0092147 A1* | 3/2018 | Pelletier | H04W 12/06 |
| 2018/0184362 A1* | 6/2018 | Babaei | H04W 48/10 |
| 2018/0220459 A1 | 8/2018 | Park et al. | |
| 2019/0281480 A1* | 9/2019 | Wei | H04B 7/0695 |
| 2020/0053799 A1* | 2/2020 | Jeon | H04L 5/0048 |
| 2020/0163000 A1 | 5/2020 | Babaei et al. | |
| 2021/0385731 A1 | 12/2021 | Dinan | |

FOREIGN PATENT DOCUMENTS

| | | | | |
|---|---|---|---|---|
| KR | 10-2017-0015251 A | 2/2017 | | |
| KR | 10-2017-0128120 A | 11/2017 | | |
| KR | 10-1838247 B1 | 3/2018 | | |
| WO | WO-2016095105 A1 * | 6/2016 | ............ | H04W 52/02 |

OTHER PUBLICATIONS

ZTE, "Discussion on initial access and mobility for NR-U", R1-1808322, 3GPP TSG RAN WG1 Meeting #94, Gothenburg, Sweden, Aug. 20-24, 2018, pp. 1-5.

Interdigital Inc., "RRM for NR-U", R2-1811456, 3GPP RAN WG2 Meeting #103, Gothenburg, Sweden, Aug. 20-24, 2018, pp. 1-3.

Huawei et al., "Initial access in NR unlicensed", R1-1808062, 3GPP TSG RAN WG1 Meeting #94, Gothenburg, Sweden, Aug. 20-Aug. 24, 2018.

ZTE, "Considerations on channel access procedure for NR-U", R2-1811281, 3GPP TSG RAN WG2 NR #103 Meeting, Gothenburg, Sweden, Aug. 20-24, 2018.

ZTE, "Simulation and Evaluation for RLM/RLF on Nr-U", R2-1811286, 3GPP Tsg-Ran WG2 meeting #103, Gothenburg, Sweden, Aug. 20-24, 2018.

European Patent Office, European Search Report of corresponding EP Patent Application No. 19854142.7, dated May 11, 2022.

* cited by examiner

METHOD AND DEVICE FOR PROCESSING CHANNEL ACCESS FAILURE IN UNLICENSED BAND

CROSS REFERENCE TO RELATED APPLICATIONS

This application is a National Stage Patent Application of PCT International Patent Application No. PCT/KR2019/010844 (filed on Aug. 26, 2019) under 35 U.S.C. § 371, which claims priority to Korean Patent Application Nos. 10-2018-0102907 (filed on Aug. 30, 2018), and 10-2019-0103888 (filed on Aug. 23, 2019), the teachings of which are incorporated herein in their entireties by reference.

TECHNICAL FIELD

The disclosure relates to technology for processing channel access failure in unlicensed bands.

BACKGROUND ART

As smartphones have been proliferated and wireless communication devices have been used for various purposes, data transmissions and receptions using wireless communication technology have been soaring. The importance of low latency has been highlighted, and the development of a post-LTE, next-generation wireless communication technology (New RAT) is underway.

Meanwhile, technology for providing wireless communication services using an unlicensed band, not a licensed band used exclusively by each operator, is being developed. In particular, in the case of an unlicensed band, since a short-range wireless communication protocol can be used simultaneously, various technologies have been developed for coexistence of a mobile communication protocol and a short-range wireless communication protocol. From this point of view, in the typical mobile communication technology, a communication service is provided to users using an unlicensed band as an auxiliary cell. However, with the development of next-generation wireless communication technology, many researches have been conducted on technology for providing mobile communication services using only an unlicensed band.

However, when a mobile communication service is provided using only an unlicensed band, it may be difficult to provide a communication service that satisfies user requirements due to coexistence with other wireless communication protocols.

In particular, when a terminal or a base station fails to access a channel in an unlicensed band, it is difficult to distinguish whether the connection failure is due to a failure to occupy a channel in an unlicensed band or other causes of radio link failure. That is, the failure of the radio link in the licensed band and the failure of channel occupation in the unlicensed band are due to different causes, and there is a need to differentiate and process them.

DETAILED DESCRIPTION OF THE INVENTION

Technical Problem

According to embodiments, there may be provided technology for efficiently processing a channel access failure that occurs in an unlicensed band.

Technical Solution

In one aspect, according to embodiments, a method for a user equipment (UE) to perform communication in an unlicensed band may include detecting a channel occupancy failure for an unlicensed band radio resource for transmitting/receiving uplink data or downlink data, when the channel occupancy failure meets a predetermined criterion, determining that channel access fails for the unlicensed band radio resource, and upon the channel access failure, transmitting a higher layer signaling to a base station.

In another aspect, according to embodiments, a method for a base station to perform communication in an unlicensed band may include transmitting information about at least one of a timer and a counter for determining a channel access failure to a UE, monitoring whether uplink data is received in an unlicensed band radio resource, and receiving a higher layer signaling transmitted as the UE determines that channel access fails.

In still another aspect, according to embodiments, a UE performing communication in an unlicensed band may include a controller configured to detect a channel occupancy failure for an unlicensed band radio resource for transmitting/receiving uplink data or downlink data and, when the channel occupancy failure meets a predetermined criterion, determining that channel access fails for the unlicensed band radio resource and a transmitter transmitting a higher layer signaling to a base station upon the channel access failure.

In yet still another aspect, according to embodiments, a base station performing communication in an unlicensed band may include a transmitter transmitting information about at least one of a timer and a counter for determining a channel access failure to a UE, a controller controlling to monitor whether uplink data is received in an unlicensed band radio resource, and a receiver receiving a higher layer signaling transmitted as the UE determines that channel access fails.

Advantageous Effects

Embodiments of the disclosure provide the effect of efficiently processing a channel access failure that occurs in an unlicensed band.

MODE FOR CARRYING OUT THE INVENTION

Figure 1:
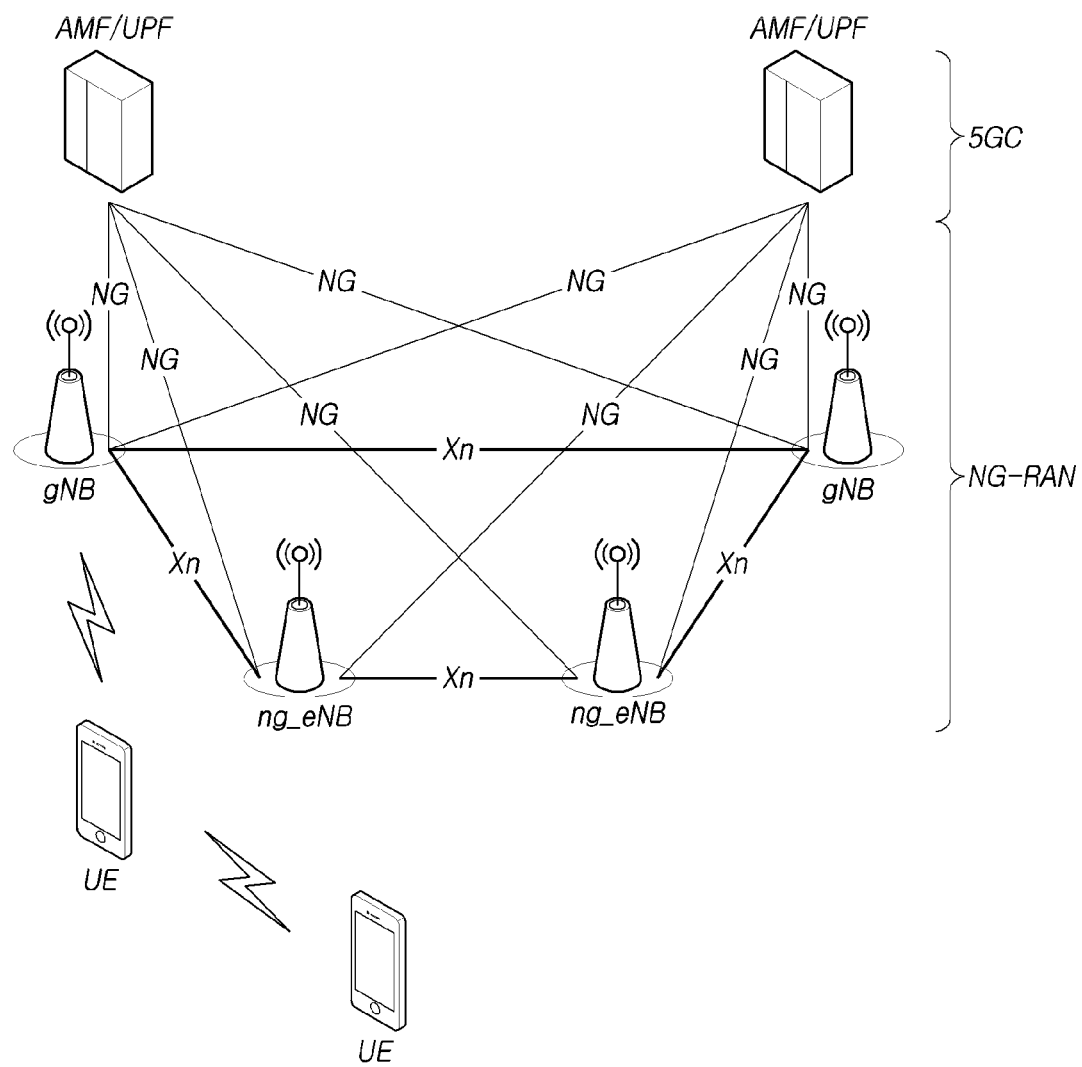
FIG. 1 is a view schematically illustrating an NR wireless communication system.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH) and a physical uplink control channel (PUCCH). The uplink and downlink transmit and receive data through a data channel such as a physical downlink shared channel (PDSCH) and a physical uplink shared channel (PUSCH). Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part, and the NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1, FR1) and frequency bands equal to or greater than 6 GHz (frequency range 2, FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, V is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
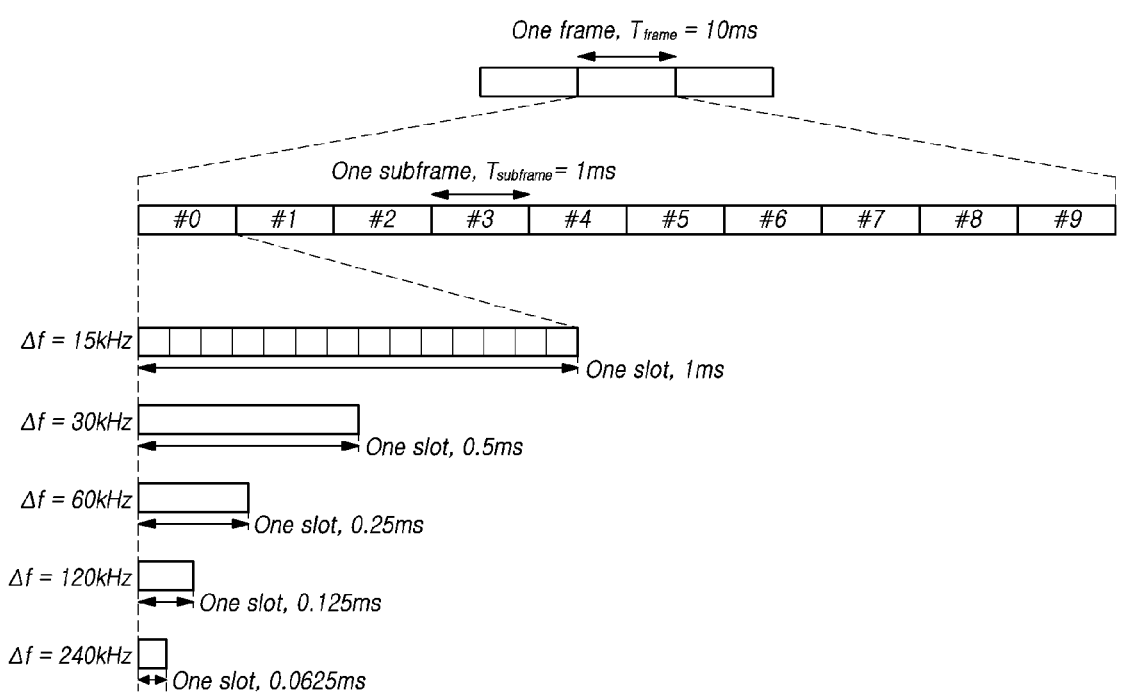
FIG. 2 is a view for explaining a frame structure in an NR system.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing. NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
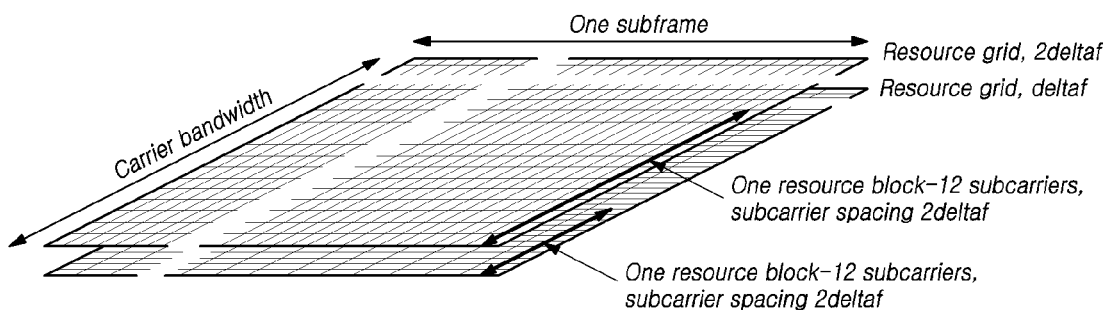
FIG. 3 is a view for explaining resource grids supported by a radio access technology.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
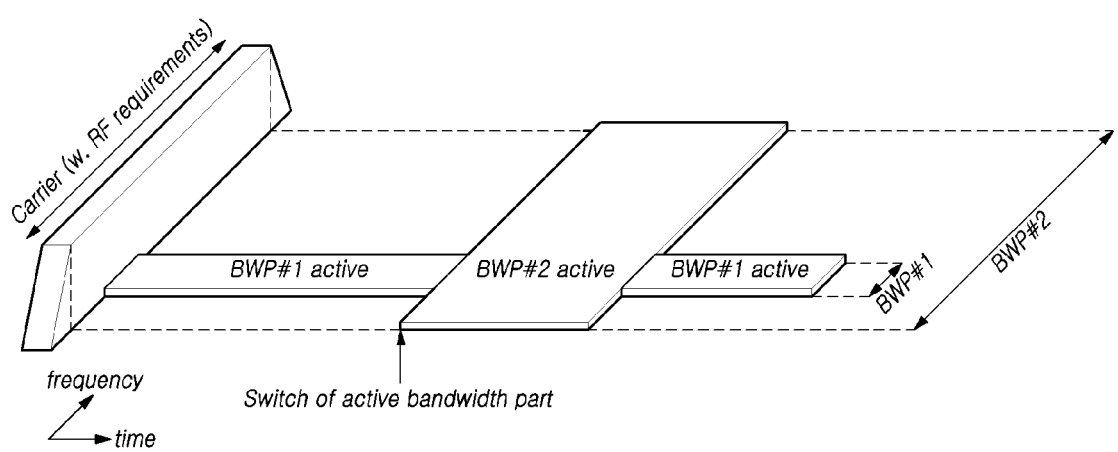
FIG. 4 is a view for explaining bandwidth parts supported by a radio access technology.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
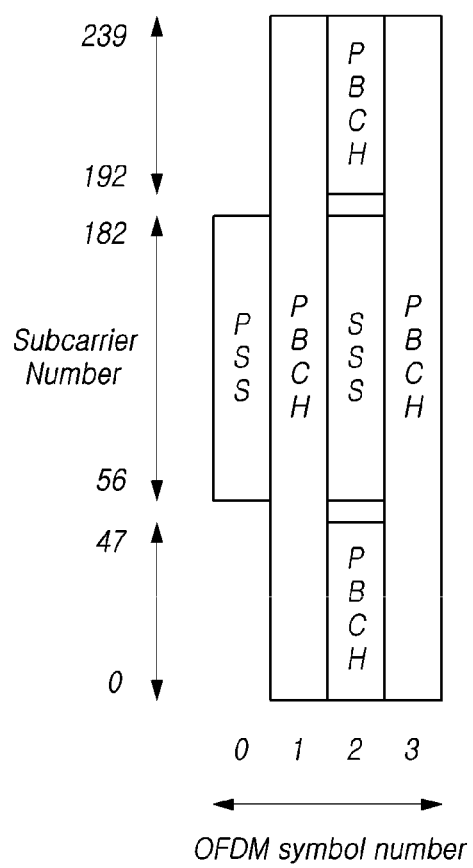
FIG. 5 is a view illustrating an example of a synchronization signal block in a radio access technology.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted through a PDSCH. In order to receive SIB1, the UE must receive numerology information used for the SIB1 transmission and the CORESET (control resource set) information used for scheduling of SIB1 through a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining SIBs may be transmitted according to the request of the UE.

Figure 6:
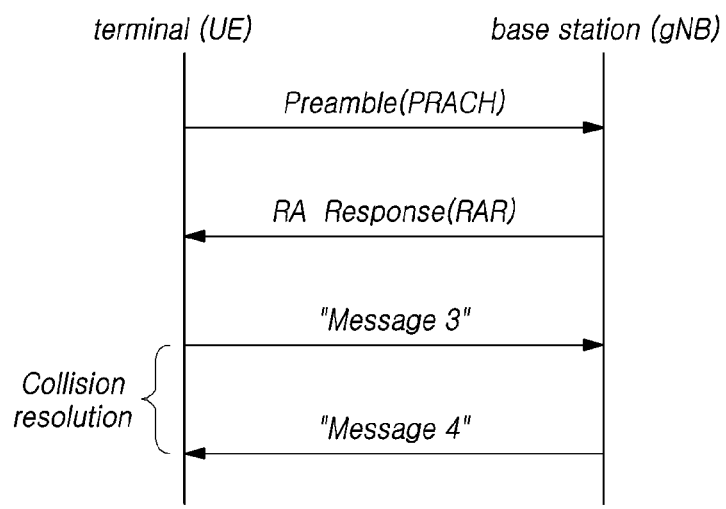
FIG. 6 is a view for explaining a random access procedure in a radio access technology.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
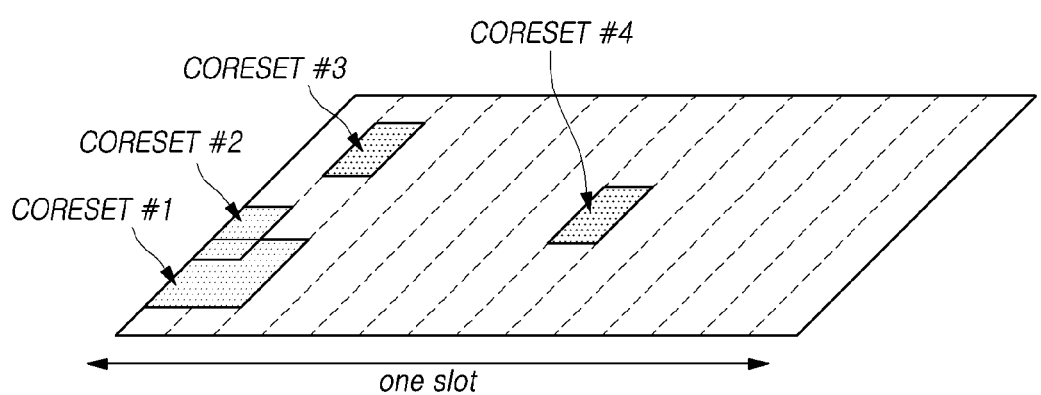
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Meanwhile, the technical spirit of the disclosure is described below in connection with two nodes, a UE and a boarding status. However, this is merely for ease of description, and the same technical spirit may apply between UEs. For example, the base station described below is an exemplary node performing communication with a UE and, as necessary, may be replaced with, e.g., another UE or an infrastructure device performing communication with the UE.

In other words, the technical spirit is applicable to device-to-device (D2D) communication, sidelink communication, or V2X communication, as well as to UE-base station communication. In particular, the technical spirit may apply to D2D communication in next-generation wireless access technology, and the terms "signal" and "channel" as used herein may be varied and applied depending on the type of D2D communication.

For example, the terms "PSS" and "SSS" may be replaced with the terms "PSSS (Primary D2D Synchronization Signal)" and "SSSS (Secondary D2D Synchronization Signal)," respectively, in D2D communication. Further, a channel transferring broadcast information, such as the above-described PBCH, may be replaced with a PSBCH, a channel transferring data in a sidelink, such as the PUSCH and PDSCH, may be replaced with a PSSCH, and a channel transferring control information, such as the PDCCH and the PUCCH, may be replaced with a PSCCH. Meanwhile, D2D communication requires a discovery signal which is transmitted or received via the PSDCH. However, the embodiments of the disclosure are not limited to such terms.

The technical spirit of the disclosure is described below in connection with, e.g., communication between a UE and a base station and, as necessary, the base station node may be replaced with another UE in which case the technical spirit may apply.

Further, a bandwidth configured as a predetermined frequency section in a carrier bandwidth is denoted a bandwidth part or BWP below, but the embodiments of the disclosure are not limited to such terms. Further, although a bandwidth configured as a predetermined frequency section in a bandwidth part is denoted a subband, the embodiments of disclosure are not limited to the terms.

For ease of description, LBT (Listen Before Talk) is described as an example of technology for coexistence of wireless communication technologies in an unlicensed band. However, the disclosure is applicable to other various co-existence techniques. Of course, the disclosure may apply not only to 5G or NR technology, which is a next-generation wireless communication technology, but also to 4G, Wi-Fi, or other various wireless communication technologies.

NR(New Radio)

NR is a next-generation wireless communication technology that is being standardized in the 3GPP. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. For example, each use scenario has different requirements in light of data rate, latency, reliability, and coverage. Therefore, as a method to efficiently satisfy the requirements for each usage scenario through the frequency band constituting an arbitrary NR system, it has been designed to efficiently multiplex radio resource units which are based on different numerologies (e.g., subcarrier spacing, subframe, TTI, etc.).

As an example, for the numerology which has different subcarrier spacing values, there are discussions about a method of multiplexing and supporting based on TDM, FDM, or TDM/FDM via one or more NR component carriers and a scheme for supporting one or more time units in configuring a scheduling unit in the time domain. In this regard, in NR, a subframe was defined as a type of time domain structure, and a 15 kHz SCS (Sub-Carrier Spacing) identical to LTE is configured as a reference numerology for defining a corresponding subframe duration. Therefore, a single subframe duration is defined which is constituted of 14 OFDM symbols of 15 kHz SCS-based normal CP overhead. That is, in NR, a subframe has a time duration of 1 ms. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, the latency requirements may be hard to meet. Thus, a mini-slot constituted of a smaller number of OFDM symbols than the slot constituted of 14 symbols may be defined and, based thereupon, scheduling capable of meeting the URLLC requirements may be carried out.

Or, as described above, numerologies with different SCS values in one NR carrier may be multiplexed via TDM and/or FDM and supported. Therefore, what may be taken into account is a scheme for scheduling data according to latency requirements based on the slot (or mini-slot) length defined per numerology. For example, in the case where the SCS is 60 kHz, the symbol length is reduced by about ¼ as compared with when the SCS is 15 kHz. Thus, if one slot is made up of 14 OFDM symbols, the 15 kHz-based slot length is 1 ms whereas the 60 kHz-based slot length is reduced to about 0.25 ms.

NR-U (NR-Unlicensed Spectrum)

Unlike the licensed band that is used exclusively by a designated operator, the unlicensed band is allowed to be used by any business operator or individual to provide wireless communication services within the regulations of each country. Accordingly, when NR service is provided through an unlicensed band, it is necessary to resolve the co-existence problem with various short-range wireless communication protocols such as Wi-Fi, Bluetooth, and NFC that are already provided through the unlicensed band. Further, the co-existence issues between each NR provider or LTE provider need to be resolved as well.

Accordingly, upon providing an NR service through an unlicensed band, a coexistence technology is required to avoid interference or collision between each wireless communication service. For example, there is a need for an LBT (Listen Before Talk)-based radio channel access method to determine whether the radio channel or carrier is available by sensing the power level of the radio channel or carrier to be used before transmitting a radio signal. In this case, if a specific radio channel or carrier in the corresponding unlicensed band is being used by another radio communication protocol or another service provider, the provision of NR service through the corresponding band may be restricted. Therefore, it is difficult to guarantee QoS requested by the user in a wireless communication service through an unlicensed band, unlike a wireless communication service through a licensed band.

In particular, NR-U may support a stand-alone scenario in which the unlicensed band is used as the PCell, unlike the typical LTE, which always supports the unlicensed band only as the SCell through CA with the licensed band. In this case, if a problem arises with the cell using the unlicensed band, the service may be disconnected. Thus, it may be hard to meet a proper QoS for the NR service.

As such, in the case where a UE performs communication using an unlicensed band, the UE has difficulty in explicitly discerning between transmission failure due to a channel occupancy attempt, such as LBT, and transmission failure due to deterioration of the corresponding radio channel. As such, when transmission failure occurs due to various causes, the corresponding cause needs to be specified to efficiently address the transmission failure issue.

Therefore, the disclosure introduces a technology for enabling a UE to gather relevant information and provide the same to a base station so that the base station may discern different causes of data transmission/reception failure. According to an embodiment, the base station may explicitly discern whether the UE's data transmission/reception failure comes from LBT failure or from deterioration of radio environment and may efficiently perform resource allocation for subsequent data transmission. The UE may reduce unnecessary radio connection reconfiguration operations and precisely identify a specific problematic situation and efficiently carry out communication.

For ease of description, embodiments will be described below by focusing on NR. However, this is solely for ease-of-description purposes, and the disclosure may be applicable to LTE or other radio access networks which also fall within the category of the disclosure. The disclosure is also applicable to common NR access technology that adopts a licensed band. The disclosure may also be used in one or more of the following unlicensed band implementation environments.

NR-U LAA: NR-U in "license assisted access" mode where primary cell is NR licensed NR-U SA: NR-U stand-alone mode ENU-DC: EN-DC where SN(Secondary Node) is NR-U NNU-DC: DC between NR licensed (MN, Master Node) and NR-U (SN)

The embodiments described below may include the details of the procedures and information elements specified in 3GPP TS 38.331, NR RRC specifications. Although no definitions of corresponding information elements or no details of the relevant procedures are included in the disclosure, the details or content specified in the standards may be used in association with the embodiments or encompassed in the scope of the disclosure.

In the following description, a channel sensing operation performed to use the above-described unlicensed band radio resource is referred to as a channel occupancy attempt or channel occupancy operation. For example, the channel occupancy attempt may mean performing of the LBT operation and may include all operations for determining whether the corresponding unlicensed band is available, such as clear channel assessment (CCA). That is, various channel sensing schemes for determining whether an unlicensed band is available may all be applicable to the disclosure, without limitations to a specific one.

Further, although the description focuses primarily on the scenario case where an unlicensed band is configured in the PCell in the disclosure, the disclosure may also be applicable where an unlicensed band is configured in the PSCell or the SCell. PCell means a cell performing RRC connection between the UE and the base station. SCell means a cell that, along with the PCell, provides an additional radio resource to the UE. PSCell means a special SCell to which a PUCCH transmission function has been assigned. The UE may perform communication with the base station using a plurality of cells in which case one PCell and one or more SCells may configure carrier aggregation. Further, the SCells may include a PSCell that has PUCCH transmission capability. Similarly, the UE may configure dual connectivity using the radio resources provided from a plurality of base stations. In this case, one or more cells provided from the master base station and one or more cells provided from the secondary base station may configure dual connectivity. Where the master base station provides two or more cells to the UE, the two or more cells are denoted a master cell group (MCG). Where the secondary base station provides two or more cells to the UE, the two or more cells are denoted a secondary cell group (SCG). One cell in the SCG may be a PSCell.

Meanwhile, a radio link failure in the RRC connecting UE may be detected in the following cases.

If N310 continuous OOS (out of sync) is received in the physical layer for the PCell, the UE starts the T310 timer. Upon receiving the N311 continuous IS (in sync) from the physical layer for the corresponding PCell while the T310 timer is operating, the UE stops the T310 timer for the corresponding PCell.

Unlike this, if the T310 timer expires, or if informed of a random access inquiry from the MCG MAC, or if informed that the maximum retransmission count was reached from the MCG RLC, the UE detects a radio link failure in the MCG. Where the UE detects the radio link failure, if the AS security has not been activated, the UE enters the RRC IDLE state. Otherwise, the UE initiates an RRC connection reconfiguration procedure.

As set forth above, NR-U may have difficulty in guaranteeing access to radio channel because it needs to support LBT. Accordingly, it may be difficult to carry out data transmission/reception that meets a predetermined QoS level. In particular, if the unlicensed band cell is congested, the LBT failure may be more frequent. In this case, the occurrence of an radio link failure may be delayed. Or, detection of a radio link failure may be delayed in the state where the PCell radio quality of the UE in the connected state has been very deteriorated.

As an example, in the case where the base station fails to transmit an RLM reference signal (RS) due to continuous LBT failures, if the UE does not consider the same as an OOS, the detection time of radio link failure may be delayed due to LBT failure. Or, in the case where the base station fails to transmit an RLM RS due to continuous LBT failures, if the UE does not consider the same as an OOS, the UE may start the T310 timer. However, after the OOS, if the base station rarely succeeds in LBT and thus transmits an RLM RS, and the UE receives the RLM RS, the T310 timer stops. Accordingly, frequent LBT failures in the state where it does not go to an RLF may lead to the circumstance where substantial data communication is difficult to perform. That is, if the UE fails to recognize an LBT failure as an OOS, detection of the RLF may be delayed or, although it is recognized as an OOS, intermittent LBT success may result in a failure in RLF detection and failure to meet communication QoS.

As another example, in the case where a delay occurs as the UE may not transmit an RACH preamble due to LBT failure, as the base station fails to transmit an RAR due to LBT failure, or as the UE fails to transmit an MSG3 due to LBT failure, transmission itself is not carried out, and thus, a significant time consumption occurs in detecting the random access issue due to communication network deterioration. Therefore, substantial radio link failure detection may be delayed.

As another example, the UE may fail to transmit uplink data transmission due to LBT failure, causing a delay in the time from the RLC to arrival of the maximum retransmission count may be delayed and resultantly a delay of radio link failure.

As such, LBT failure may be frequent if the PCell or PSCell or SCell using an unlicensed band has more loads or interference, causing a time delay in detecting a radio link failure for the state where the radio network has poor quality. Thus, an RLF detection operation according to radio network quality deterioration may be performed after LBT succeeds, so that the service disconnection time may increase. That is, if LBT failure is frequent in the state where the UE's radio quality has been deteriorated, the UE's radio link failure detection time may be delayed, so that more service disconnections may occur.

Hereinafter, operations of a UE and a base station according to the embodiments of the disclosure will described with reference to the accompanying drawings.

Figure 8:
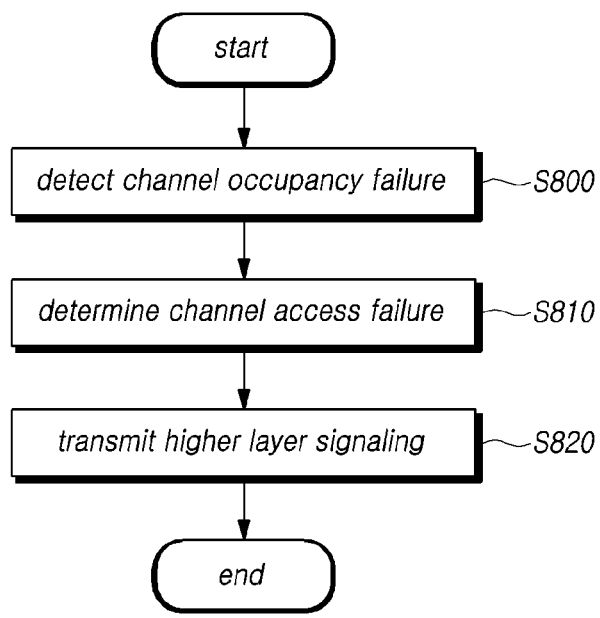
FIG. 8 is a flowchart for describing operations of a UE according to an embodiment.

FIG. 8 is a flowchart for describing operations of a UE according to an embodiment.

Referring to FIG. 8, a UE performing communication in an unlicensed band may perform the step of detecting a channel occupancy failure for the unlicensed band radio resource for transmitting/receiving uplink data or downlink data (S800).

As an example, the UE may perform the operation of a channel occupancy attempt for an unlicensed band radio resource to transmit uplink data so as to transmit uplink data in an unlicensed band. The channel occupancy attempt operation may mean the above-described LBT operation. Here, channel occupancy failure means an occasion where the UE may not perform data transmission as a result of performing channel sensing in an unlicensed band for transmission of uplink data. That is, channel occupancy failure may mean an LBT failure.

Further, the channel occupancy failure in transmission of uplink data may include at least one of a failure to transmit a scheduling request message in an unlicensed band for transmission of uplink data, a failure to transmit a random access preamble, and a failure in uplink data channel transmission. For example, when the physical layer (PHY) fails to transmit a PUSCH, a random access preamble, or a scheduling request message on the unlicensed band uplink radio resource indicated by the MAC, the UE may determine that it is a failure to occupy the corresponding channel. The causes of transmission failure may include a channel occupancy attempt failure such as an LBT failure.

As another example, to receive downlink data in an unlicensed band, the UE may detect the channel occupancy failure by checking whether a reference signal transmitted in the unlicensed band radio resource is received. In this case, the channel occupancy attempt operation is performed by the base station, and a reference signal is transmitted. The UE checks whether the reference signal is received and determines whether the base station has failed to occupy the corresponding channel. When the reference signal is not received, the UE may detect that the base station has failed to occupy the corresponding channel.

When the channel occupancy failure meets a predetermined criterion, the UE may perform the step of determining that it is a channel access failure for the unlicensed band radio resource (S810).

For example, when it fails to occupy a channel (e.g., a channel occupancy failure), the UE does not immediately determine that channel access for the unlicensed band radio resource has failed. If the UE detects one channel occupancy failure and immediately determines that the channel access fails, the UE or the base station needs to perform each of the following operations for RLF processing. Thus, multiple operations for overcoming the channel access failure are required to be performed when a channel occupancy failure, such as a temporary LBT failure, occurs, and this may cause unnecessary power consumption and operations. Thus, according to the embodiments of the disclosure, the UE may determine a channel access failure by performing the following operations.

As an example, in the case of uplink, the UE may determine a channel access failure when the number of channel occupancy failures in the unlicensed band radio resource for uplink data transmission exceeds a threshold configured by the base station. That is, the UE may determine failure in accessing the channel (e.g., a channel access failure) when consistent channel occupancy failures occur.

As another example, in the case of downlink, the UE determines failure in accessing the channel when the number of channel occupancy failures in the unlicensed band radio resource for downlink data reception exceeds a threshold configured by the base station. However, in the case of downlink, the number of channel occupancy failures is counted based on the result of measurement of the reference signal transmitted from the base station, as described above. As an example, unless the reference signal transmitted from the base station is received in a chance of receiving the reference signal, the UE determines that the channel occupancy fails and monitors whether it is received in a subsequent chance of reception. In this case, unless the reference signal is received in the chance of reception of the reference signal, the UE may add one to the channel occupancy failure count. If the channel occupancy failure exceeds a threshold, the UE determines that the base station fails to access the unlicensed band radio resource for downlink data transmission and determines that channel access fails.

As another example, the UE may determine that the channel access fails when the timer configured in association with channel occupancy failure in the unlicensed band radio resource expires or the counter meets a threshold. For example, if the N consecutive channel occupancy failures occur in the unlicensed band radio resource for uplink data transmission, the UE initiates the timer configured by the base station. Here, N is 1 or a natural number not less than 1 and may be configured or previously defined/configured by the base station. Or, the UE may initiate the timer configured by the base station when uplink transmission is started on the unlicensed band uplink radio resource indicated by the MAC. Thereafter, if channel occupancy for the unlicensed band radio resource fails consecutively during a predetermined duration, so that the timer expires, the UE determines that channel access fails. Or, if channel occupancy fails in the unlicensed band radio resource for uplink data transmission, the UE increase the value of the counter. If the value of the counter meets a threshold configured by the base station, the UE determines that channel access fails. Similarly in the case of downlink, if the reference signal is not received in N consecutive chances of reference signal reception, the UE initiates the timer and, unless the reference signal is received until the timer expires, determines that channel access fails for the unlicensed band radio resource for downlink data reception. Here, N is 1 or a natural number not less than 1 and may be configured or previously defined/configured by the base station. Or, if the reference signal is not received in the chances of reception of reference signal, the UE increases the counter value and, if the counter value meets the threshold configured by the base station, determines that channel access fails for the unlicensed band radio resource for reception of downlink data. Hereinbefore, the embodiments were described in which the counter value meets the threshold. However, the embodiments are not limited thereto. For example, the embodiments may be applicable even where the counter value exceeds the threshold. In other words, the threshold may be a trigger value for determining a channel access failure or may be set to the maximum value immediately before determining that channel access fails. In the case where it is set as the maximum value, if the threshold is exceeded, it may be determined to be a channel access failure.

Besides, the UE may determine a channel access failure according to various detailed operations described below according to embodiments.

Upon channel access failure, the UE may perform the step of transmitting higher layer signaling to the base station (S820).

Upon determining that channel access fails for the unlicensed band radio resource, the UE transmits higher layer signaling to the base station to perform a processing operation according to the channel access failure.

For example, the higher layer signaling may include at least one information of channel occupancy information for the radio resource where channel access has failed, RSSI information, channel occupancy failure count information, channel occupancy failure ratio information, channel occupancy failure duration information, channel occupancy failure time information, channel occupancy failure period information, failure cause information, reporting cause information, information for the cell where channel access has failed, subband information, and bandwidth part information. Or, the higher layer signaling may be an RRC message, an SCG failure information message, or a failure information message.

As an example, if a channel access failure occurs in the PCell (Primary Cell), the UE transmits an RRC connection reconfiguration request message to the base station, thereby initiating an RRC connection reconfiguration procedure. As an example, if a channel access failure occurs in the PSCell (Primary SCell) or SCell (Secondary Cell), the UE transmits an SCG (Secondary Cell Group) failure information message or failure information message to the base station.

Upon receiving the higher layer signaling from the UE, the base station may instruct the UE to hand over, reconfigure an RRC connection, or perform an operation, such as secondary cell change/release/addition. Or, the base station may change the unlicensed band radio resource where the channel access has failed. For example, the base station may instruct to change the bandwidth part or subband of the unlicensed band.

Figure 9:
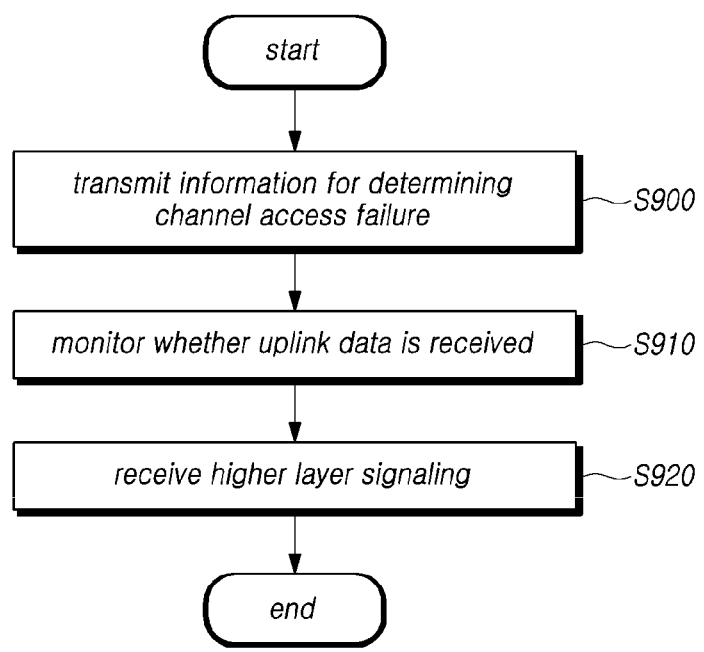
FIG. 9 is a flowchart for describing operations of a base station upon reception of uplink data according to an embodiment.

FIG. 9 is a flowchart for describing operations of a base station upon reception of uplink data according to an embodiment.

Referring to FIG. 9, the base station performing communication in an unlicensed band may perform the step of transmitting information for at least one of the timer and counter for determining a channel access failure to the UE (S900).

As described above, the UE may detect failure in occupying a channel (e.g., a channel occupancy failure) for the unlicensed band radio resource. To that end, the base station may transmit at least one information of timer information and counter information used for the UE to determine a channel occupancy failure to the UE. The information for determining a channel occupancy failure may be transferred to the UE via system information, cell-specific signaling or UE-specific signaling.

The information for determining a channel access failure is utilized when the UE fails in channel occupancy for the unlicensed band radio resource in uplink data transmission as described above in connection with FIG. 8.

The base station may perform the step of monitoring whether uplink data is received in the unlicensed band radio resource (S910).

Meanwhile, the base station may allocate a radio resource to the UE for the UE to transmit uplink data using the unlicensed band radio resource. The UE may perform a channel occupancy attempt for the allocated unlicensed band radio resource and detect a channel occupancy failure. The base station monitors whether uplink data is received in the unlicensed band radio resource allocated to the UE. If the UE fails to occupy channel in the corresponding radio resource, the base station may not receive uplink data.

The UE may attempt channel occupancy via the operations described above in connection with FIG. 8 and may determine whether channel access fails.

The base station may perform the step of receiving higher layer signaling that is transmitted from the UE determining a channel access failure (S920).

As an example, the UE may determine the channel access failure when the number of channel occupancy failures in the unlicensed band radio resource for uplink data transmission exceeds a threshold. Here, the threshold may be configured by the base station or may be pre-configured in the UE. That is, the UE may determine the channel access failure when consistent channel occupancy failures occur.

As another example, the UE may determine that the channel access fails when the timer configured in association with channel occupancy failure in the unlicensed band radio resource expires or the counter meets a threshold. For example, if the N consecutive channel occupancy failures occur in the unlicensed band radio resource for uplink data transmission, the UE initiates the timer configured by the base station. Here, N is 1 or a natural number not less than 1 and may be configured or previously defined/configured by the base station. Or, the UE may initiate the timer configured by the base station when uplink transmission is started on the unlicensed band uplink radio resource indicated by the MAC. Thereafter, if channel occupancy for the unlicensed band radio resource fails consecutively during a predetermined duration, so that the timer expires, the UE determines that channel access fails. Or, if channel occupancy fails in the unlicensed band radio resource for uplink data transmission, the UE increase the value of the counter. If the value of the counter meets a threshold configured by the base station, the UE determines that channel access fails. Hereinbefore, the embodiments were described in which the counter value meets the threshold. However, the embodiments are not limited thereto. The embodiments may be applicable even where the counter value exceeds the threshold. In other words, the threshold may be a trigger value for determining a channel access failure or may be set to the maximum value immediately before determining that channel access fails. In the case where it is set as the maximum value, if the threshold is exceeded, it may be determined to be a channel access failure.

Upon determining that channel access fails for the unlicensed band radio resource, the UE transmits higher layer signaling to the base station to perform a processing operation according to the channel access failure.

For example, the higher layer signaling may include at least one information of channel occupancy information for the radio resource where channel access has failed, RSSI information, channel occupancy failure count information, channel occupancy failure ratio information, channel occupancy failure duration information, channel occupancy failure time information, channel occupancy failure period information, failure cause information, reporting cause information, information for the cell where channel access has failed, subband information, and bandwidth part information. For example, the higher layer signaling received by the base station may be an RRC message, an SCG failure information message, or a failure information message.

As an example, if the UE's channel access failure occurs in the PCell (Primary Cell), the base station receives an RRC connection reconfiguration request message, thereby initiating an RRC connection reconfiguration procedure. As an example, if the UE's channel access failure occurs in the PSCell (Primary SCell) or SCell (Secondary Cell), the base station receives an SCG (Secondary Cell Group) failure information message or failure information message.

Upon receiving the higher layer signaling from the UE, the base station may instruct the UE to hand over, reconfigure an RRC connection, or perform an operation, such as secondary cell change/release/addition. Or, the base station may change the unlicensed band radio resource where the channel access has failed. For example, the base station may instruct to change the bandwidth part or subband of the unlicensed band.

By these operations according to the embodiments, the base station may quickly and precisely identify an RLF due to channel access failure when the UE transmits uplink data using the unlicensed band radio resource.

Figure 10:
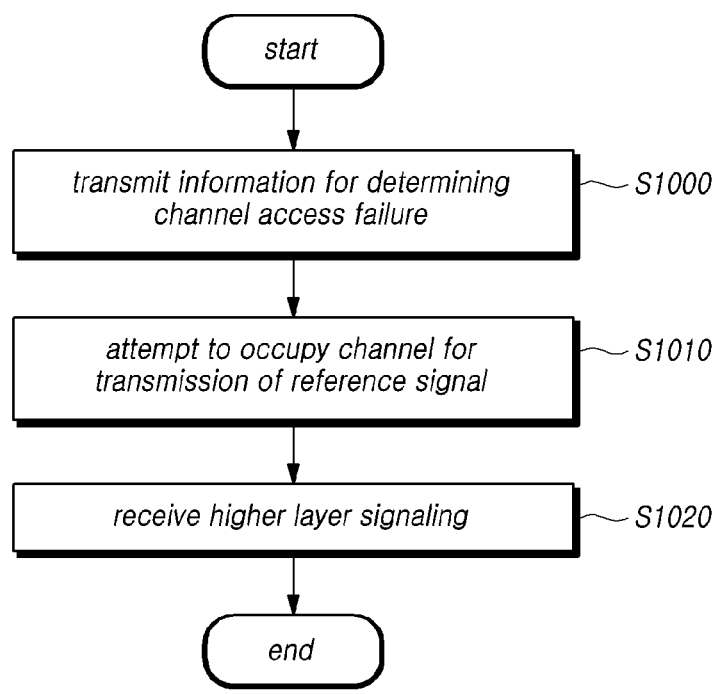
FIG. 10 is a flowchart for describing operations of a base station upon transmission of downlink data according to an embodiment.

FIG. 10 is a flowchart for describing operations of a base station upon transmission of downlink data according to an embodiment.

Referring to FIG. 10, even when transmitting downlink data to the UE, the base station performing communication in an unlicensed band may perform the step of transmitting information for at least one of the timer and counter for determining a channel access failure to the UE (S1000).

For example, the base station transfers at least one information of timer information and counter information used for the UE to determine a channel occupancy failure to the UE via system information, cell-specific signaling, or UE-specific signaling.

The base station performs a channel occupancy attempt operation to transmit a reference signal using an unlicensed band radio resource (S1010). When a predetermined period or a specific condition is met, the base station transmits a reference signal in an unlicensed band radio resource for downlink data transmission. However, as transmission of the reference signal also uses an unlicensed band radio resource, the base station performs a channel occupancy attempt operation in the radio resource for transmission of a reference signal before transmitting a reference signal. For example, the base station performs an LBT operation.

As described above, when the unlicensed band radio resource is congested or fails to meet a preset occupancy reference value, the base station detects a channel occupancy failure. Upon detecting the channel occupancy failure, the base station may again perform a channel occupancy attempt operation in the next time period.

The base station may perform the step of receiving higher layer signaling that is transmitted from the UE determining a channel access failure (S1020).

As an example, the UE may determine failure in accessing a channel (e.g., a channel access failure) when the number of channel occupancy failures in the unlicensed band radio resource for downlink data reception exceeds a threshold configured by the base station. That is, the UE may determine the channel access failure when consistent channel occupancy failures occur. The number of channel occupancy failures is counted based on the result of measurement of the reference signal transmitted from the base station. As an example, unless the reference signal transmitted from the base station is received in a chance of receiving the reference signal, the UE determines that the channel occupancy fails and monitors whether it is received in a subsequent chance of reception. In this case, unless the reference signal is received in the chance of reception of the reference signal, the UE may add one to the channel occupancy failure count. If the channel occupancy failure exceeds a threshold, the UE determines that the base station fails to access the unlicensed band radio resource for downlink data transmission and determines that channel access fails.

As another example, the UE may determine that the channel access fails when the timer configured in association with channel occupancy failure in the unlicensed band radio resource expires or the counter meets a threshold. If the reference signal is not received in N consecutive chances of reference signal reception, the UE initiates the timer. Unless the reference signal is received until the timer expires, the UE determines that channel access fails for the unlicensed band radio resource for downlink data reception. Here, N is 1 or a natural number not less than 1 and may be configured or previously defined/configured by the base station. Or, if the reference signal is not received in the chances of reception of reference signal, the UE increases the counter value. If the counter value meets the threshold configured by the base station, the UE determines that channel access fails for the unlicensed band radio resource for reception of downlink data. Hereinbefore, the embodiments were described in which the counter value meets the threshold in the disclosure. However, the embodiments are not limited thereto. For example, the embodiments may be applicable even where the counter value exceeds the threshold. In other words, the threshold may be a trigger value for determining a channel access failure or may be set to the maximum value immediately before determining that channel access fails. In the case where it is set as the maximum value, if the threshold is exceeded, it may be determined to be a channel access failure.

Upon determining that channel access fails for the unlicensed band radio resource, the UE transmits higher layer signaling to the base station to perform a processing operation according to the channel access failure.

For example, the higher layer signaling may include at least one information of channel occupancy information for the radio resource where channel access has failed, RSSI information, channel occupancy failure count information, channel occupancy failure ratio information, channel occupancy failure duration information, channel occupancy failure time information, channel occupancy failure period information, failure cause information, reporting cause information, information for the cell where channel access has failed, subband information, and bandwidth part information. For example, the higher layer signaling received by the base station may be an RRC message, an SCG failure information message, or a failure information message.

As an example, if the UE's channel access failure occurs in the PCell (Primary Cell), the base station receives an RRC connection reconfiguration request message, thereby initiating an RRC connection reconfiguration procedure. As an example, if the UE's channel access failure occurs in the PSCell (Primary SCell) or SCell (Secondary Cell), the base station receives an SCG (Secondary Cell Group) failure information message or failure information message.

Upon receiving the higher layer signaling from the UE, the base station may instruct the UE to hand over, reconfigure an RRC connection, or perform an operation, such as secondary cell change/release/addition. Or, the base station may change the unlicensed band radio resource where the channel access has failed. For example, the base station may instruct to change the bandwidth part or subband of the unlicensed band.

Hereinafter, the above-described embodiments of the operations of processing a channel access failure due to a channel occupancy failure, performed by the UE and the base station will be described below in greater detail. Further, an additional embodiment, along with a more detailed description of the above embodiments, will be described below. The following embodiments may be performed by the UE and the base station individually or in any combination.

In the following description, the channel occupancy attempt is referred to as an LBT operation, and the channel occupancy failure is referred to as an LBT failure. However, this is merely for ease of description and, as described above, various channel sensing techniques may all be applicable to the operation of determining whether an unlicensed band is used, other than the LBT operation.

First Embodiment: A Method for Determining a Channel Access Failure Via, e.g., Detection of an LBT Failure Exceeding an Indicated Threshold As an example, upon detecting an LBT failure exceeding a threshold indicated by the base station when attempting uplink transmission, the UE may initiate a channel access failure procedure. As an example, the UE may detect an LBT failure exceeding the indicated threshold, e.g., upon transmission of one or more signalings of an RACH preamble, an MSG 3, a measurement report, an RRC connection reconfiguration complete message, an RRC connection reconfiguration complete message after handover, an SR, and a BSR. The above-described MSG1 transmission (via PRACH), SR transmission (via PUCCH), or transmission via PUSCH (MSG 3 transmission, measurement report transmission, RRC connection reconfiguration complete message transmission, after-handover RRC connection reconfiguration complete message transmission, or BSR transmission) is an initiation of uplink transmission by the UE, and uplink transmission is performed in the PHY via the uplink radio resource indicated by the MAC. Since the corresponding transmission is initiated from the UE, the base station is unaware whether the corresponding transmission occurs. Accordingly, channel access failure may be detected for the above-described MSG1 transmission, SR transmission, or transmission via PUSCH.

Or, the UE may detect an LBT failure exceeding the threshold indicated in any uplink signal transmission attempt. As an example, when uplink transmission is configured by the base station and performed by the physical layer, as a CSI report, HARQ feedback, or SRS transmission, a channel access failure may be detected. As another example, since the CSI report, HARQ feedback, and SRS transmission are configured by the base station, and uplink transmission is performed by the physical layer, the base station may be aware of the period of the corresponding uplink transmission. Thus, when no transmission is made due to channel occupancy failure for the corresponding uplink transmission, the base station may be aware of the same. Accordingly, a channel occupancy failure for one or more of the CSI report, HARQ feedback, and SRS transmission may not be taken into consideration in detecting channel access failure. For example, it may be possible not to increase the counter value for counting consecutive channel access failures. Or, the corresponding occupancy failure may be detected separately from channel occupancy failure for the above-described MSG1 transmission, SR transmission, or transmission via PUSCH. Thus, the UE may separately indicate to the base station channel access failures per transmission type (e.g., RACH, SR, or PUSCH). The physical layer of the UE may detect whether there is an LBT failure by performing an LBT operation in transmitting an uplink transmission block. When the detected LBT failure count exceeds an indicated threshold, the UE may indicate the same via a higher layer.

Or, upon detecting the base station's LBT failure exceeding the indicated threshold in the case of downlink, the UE may initiate a procedure for addressing the same. The procedure for processing channel access failure may be the above-described procedure according to higher layer signaling transmission or an RLF processing procedure as defined in the 3GPP.

As another example, the UE may detect a downlink LBT failure and initiate a procedure for channel access failure processing. For example, in NR, an RRC connecting UE may be configured with a plurality of configurable reference signals (reference signals, RSs) used for radio link measurement (RLM). As the RLM RS, at least one of an SSB and a CSI-RS may be used. However, in NR-U, the RLM RS may differ from that in NR. For example, the RS architecture in the unlicensed band may be varied as the DRS is defined in Rel-13 LAA to reduce the number of times of competition for media. However, although the RLM RS architecture is varied in NR-U, the base station needs to perform the LBT operation to transmit the RLM RS in NR-U. If the base station indicates a transmission occasion/window/resource of RLM RS for a specific UE, the UE (the UE's physical layer) may estimate the base station's LBT failure via RRM measurement/RLM in the indicated transmission occasion/window/resource. Since the LBT failure does not mean a BLER level at which a radio link failure may be caused, the LBT failure need not be indicated as an OOS. However, as described above, excessive LBT failures may delay the radio link failure or data transmission.

Thus, upon detecting the number of LBT failures exceeding any threshold indicated by the base station, the RRC connecting UE may initiate a procedure for addressing the same. A condition for triggering such procedure may be met upon detecting the number of LBT failures or LBT failure ratio which exceeds any threshold during a specific time interval indicated by the base station. And/or, the procedure triggering condition may be met by channel occupancy detection exceeding a threshold indicated by the base station or by channel occupancy detection exceeding a threshold during a specific time interval indicated by the base station. And/or, the procedure triggering condition may be met by RSSI detection exceeding a threshold indicated by the base station or by RSSI detection exceeding a threshold during a specific time interval indicated by the base station.

As such, in the case of downlink, the UE may detect an LBT failure using, e.g., whether the reference signal is received or the received strength. Further, upon detecting an LBT failure, the UE may determine whether a channel access failure occurs using information, e.g., the interval or threshold indicated by the base station.

As another example, the base station may indicate, to the UE, identification information for discerning and identifying the BWPs/subbands belonging to one serving cell allocated to the UE. The base station may make such a configuration as to allow the UE to separately monitor LBT failures per BWP/subband. Upon reporting channel access failure information to the base station, the UE may include per-BWP/subband identification information. Thus, the UE may separately indicate, to the base station, channel access failures per cell, per subband, or per BWP.

As another example, the base station may indicate, to the UE, information for separately measuring COs and/or RSSIs with the BWPs/subbands belonging to one serving cell allocated to the UE. The base station may make such a configuration as to allow the UE to separately COs and/or RSSIs per BWP/subband. Upon reporting channel access failure information to the base station, the UE may include per-BWP/subband identification information.

As detecting an LBT failure, the UE may determine a channel access failure and, upon channel access failure, transmit a higher layer signaling including channel access failure information to the base station.

Second Embodiment: Detection of Channel Access Failure Via Counter and/or Timer Operation As an example, the UE may manage a specific counter (COUNTER) as a variable to determine a channel access failure (or radio link failure) due to an LBT failure or to restrict service disconnection time due to channel access failure.

The UE sets the counter to 1 when a procedure for performing an LBT operation begins. As an example, the UE sets the counter to 1 upon a new uplink transmission attempt. When new uplink transmission is initiated on the unlicensed band uplink radio resource indicated by the MAC, the MAC sets the corresponding counter to 1. As another example, upon receiving a new uplink transmission indication on the unlicensed band uplink radio resource by the higher layer (MAC), the physical layer (PHY) sets the corresponding counter to 1. Upon detecting an LBT failure (in the MAC or the physical layer), the UE (the UE's physical layer) increases the counter by one. If the counter value reaches a threshold indicated by the base station, the UE (the UE's MAC/physical layer) may indicate this via a higher layer (MAC or RRC). The UE may determine a channel access failure according to the counter value which is varied due to the LBT failure.

As another example, the UE may manage a specific timer to detect a channel access failure due to an LBT failure or to restrict service disconnection time due to an LBT failure.

The UE starts the timer when a procedure for performing an LBT operation begins. As an example, the UE starts the timer in a new uplink transmission attempt. When new uplink transmission is initiated on the unlicensed band uplink radio resource indicated by the MAC, the UE starts the corresponding timer. As another example, the UE starts the timer as the higher layer (MAC or RRC) procedure begins. The UE (the UE's higher layer (MAC or RRC)) indicates a detection/check/monitoring for LBT failure via the UE's physical layer. Upon detecting an LBT success (success in data transmission or reception) (or upon detecting LBT success consecutively/at a predetermined rate or more), the UE indicates the same by the UE's higher layer. The UE's higher layer stops the timer.

When the UE (the UE's physical layer) detects an LBT failure (or upon failing to detect LBT success consecutively/at a predetermined rate or more), the timer keeps on operating. Or, the UE may instruct to restart the timer by its higher layer. If N consecutive channel occupancy failures occur in the unlicensed band uplink radio resource indicated by the MAC, the UE initiates the timer configured by the base station. Here, N is 1 or a natural number not less than 1 and may be configured or previously defined/configured by the base station. If the timer expires, the UE may consider the same as channel access failure having been detected due to an LBT failure.

As another example, the UE may manage a specific rate as a variable to detect a channel access failure due to an LBT failure or to restrict service disconnection time due to an LBT failure.

The UE sets the rate to a default value (e.g., 0) when a procedure for performing an LBT operation begins. As an example, the UE sets the rate to the default value in a new uplink transmission attempt. As another example, upon receiving an indication by the higher layer, the UE sets the rate to the default value. The UE (the UE's physical layer) checks/monitors LBT failure, thereby calculating the rate. If the rate reaches a threshold indicated by the base station, the UE (the UE's MAC/physical layer) may indicate this via a higher layer (MAC or RRC). The UE may detect a channel access failure due to an LBT failure.

As such, the UE may determine a channel access failure using the counter, timer, or rate indicated by the base station.

Hereinafter, an embodiment for processing when a channel access failure due to an LBT failure is detected will be described.

Embodiment of Transmitting Higher Layer Signaling to Base Station Upon Determining Channel Access Failure For example, if the above-described LBT failure count reaches a threshold, if the counter reaches a threshold indicated by the base station, or if the above-described timer expires or the above-described rate reaches a threshold indicated by the base station, the UE may transmit higher layer signaling containing LBT failure-related information to the base station. And/or, the UE may initiate a procedure for addressing channel access failure. As such, when a channel access failure occurs, the counter value may be reset. As set forth above, the UE may initiate a procedure for addressing the issue by also considering a CO exceeding the threshold and/or an RSSI exceeding the threshold. The UE may transmit LBT failure-related information to the base station via higher layer signaling.

As an example, the UE which uses the SCG's PSCell in the unlicensed band may transmit SCG LBT failure-related information to the base station via the MCG. For example, the UE may transmit an SCG failure information message to the base station.

As another example, the UE which uses the MCG's PCell in the unlicensed band may transmit LBT failure-related information to the base station. The LBT failure-related information transmitted to the base station may be transmitted via an uplink RRC message or the MAC CE or PHY (PUCCH or PUSCH). Or, the LBT failure-related information may be transmitted to the base station via an RRC connection reconfiguration request message. Or, the LBT failure-related information may be transmitted to the base station via an RRC connection reconfiguration complete message or uplink information transmission message which is transmitted to the base station after the RRC connection reconfiguration request message is transmitted. The RRC connection reconfiguration complete message may contain information for indicating that the LBT failure-related information is available. The base station may send a request for LBT failure-related information to the UE and receive the same via an uplink information transmission message.

As another example, the UE which uses the MCG's PCell in the unlicensed band may attempt to access the corresponding channel to transmit the LBT failure-related information via a subband/BWP/cell/CC other than the subband/BWP/cell/CC where an LBT failure (or channel access failure) has been detected. The base station may previously configure, in the UE, a subband/BWP/cell/CC information for transmission of channel access failure due to LBT failure, via RRC signaling.

As another example, the UE which uses the MCG's PCell in the unlicensed band may transmit, to the base station, the LBT failure-related information via a subband/BWP/cell/CC other than the subband/BWP/cell/CC where an LBT failure (or channel access failure) has been detected.

Meanwhile, the base station may configure, in the UE, information or conditions necessary for detecting a channel access failure due to an LBT failure, for restricting the service disconnection time due to an LBT failure, or for indicating reporting for the channel occupancy state of the unlicensed band cell. As an example, the base station may configure, in the UE, one or more of channel occupancy threshold, RSSI threshold, maximum LBT failure threshold, measurement time, measurement period and measurement target subband/BWP/cell/CC identification information. If the condition configured in the UE by the base station is met, the UE may transmit LBT failure-related information to the base station.

Meanwhile, the LBT failure-related information transmitted to the base station by the UE may include one or more of channel occupancy, RSSI, number of LBT failures, LBT failure rate, LBT failure duration, measurement time, measurement period, causes of failure indicating channel access failure due to LBT failure, causes of reporting, subband/BWP/cell/CC identification information and per-subband/BWP/cell/CC CO measurements/RSSI measurements/number of LBT failures/LBT failure rates.

Embodiment for Operation of Addressing Channel Access Failure Upon Determining Channel Access Failure Upon detecting a channel access failure due to an LBT failure in the PCell, the UE may initiate an RRC connection reconfiguration/resuming procedure. As an example, upon detecting a channel access failure on RACH transmission in the PCell, the UE may declare an RLF and initiate an RRC connection reconfiguration procedure. For example, the UE suspends all the RBs except for SRB0. The UE resets the MAC. The UE releases the MCG SCell. The UE applies a default physical channel configuration. The UE applies a default MAC main configuration. The UE performs cell selection. At this time, the UE may perform cell selection while excluding/forbidding the cell where a channel access failure due to an LBT failure has occurred.

Or, the UE sets the source PCell with the UE identity, sets the physical cell ID as the physical cell identity of the source PCell, sets the cause of resetting as channel access failure due to an LBT failure, and transmits an RRC reconfiguration request message to the base station. At this time, the UE transmits the RRC reconfiguration request message to the base station in a cell except for/with the cell forbidden where the channel access failure due to an LBT failure has occurred. To that end, a new value for the cause of setting may be defined as the value for the cause of setting, or the channel access failure due to LBT failure may be existing other cause of setting. Or, the RRC connection reconfiguration complete message that follows may contain information for indicating that the LBT failure-related information is available. The base station may request the UE to transmit LBT failure-related information and receive the same via an uplink information transmission message.

Or, an I-RNTI may be set as the UE identity, and the cause of resuming may be set as a channel access failure due to an LBT failure, and an RRC resuming request message is transmitted to the base station. Or, indication information to perform an RRC connection reconfiguration/resuming in a new cell other than the source cell where the UE has detected a channel access failure due to an LBT failure may be previously configured in the UE. In this case, the UE may camp on the cell indicated via the indication information. The indication information may include one or more of the physical cell identity, SSB information (e.g., time domain location of SSB transmission), subcarrier spacing information and new UE identity (C-RNTI) information.

Or, the UE may hand over to a new target cell. For example, the UE may synchronize with the new target cell (e.g., syncs in downlink or performs a random access procedure) and transmit an RRC reconfiguration complete message to the target base station, thereby completing the RRC handover procedure. To that end, a handover configuration of the target cell and conditions for handing over to the target cell may be previously configured in the UE. The handover conditions may include the above-described condition information for detecting a channel access failure due to an LBT failure. The target cell handover configuration information may include one or more of the physical cell identity, SSB information (e.g., time domain location of SSB transmission), subcarrier spacing information and new UE identity (C-RNTI) information.

Or, if the base station receives the higher layer signaling transmitted from the UE upon a channel access failure due to an LBT failure, the base station may instruct the UE to change the subband/BWP/cell/CC where the channel access failure has been detected, using the information contained in the higher layer signaling.

As an example, when detection of a channel access failure due to an LBT failure is identified at the cell level, if a channel access failure due to an LBT failure is detected in the PCell, the base station performs a handover procedure. If a channel access failure due to an LBT failure is detected in the SCell, the base station performs an SCell release/change procedure. As another example, when detection of a channel access failure due to LBT failure detection is identified at the cell level, if a channel access failure due to an LBT failure is detected in the PSCell, the base station performs a PSCell change/SCG change/SCG release procedure. As another example, if a channel access failure due to an LBT failure is identified at the BWP/subband level, the base station may perform BWP switching or subband change operation.

Embodiment of Scaling Relevant Parameters Based on CO and/or RSSI

In the legacy LTE LAA technology that supports an unlicensed band via the SCell, an RSSI (Received Signal Strength Indicator) and CO (channel occupancy) parameters have been adopted to aid the base station in selecting an unlicensed band carrier. CO denotes the percentage of the samples which are higher than a threshold (channelOccupancyThreshold) configured in the reporting configuration associated with the RSSI.

When the CO indicates a higher value, this means that there is a higher chance of occurrence of an LBT failure. Accordingly, if the CO is a higher value, the radio link failure detection time of the UE may be delayed, so that service disconnection may be more frequent. Thus, if the CO exceeds a specific threshold, it may be preferable that the base station changes the corresponding serving cell. Or, if the CO exceeds a specific threshold, it may be preferable that the base station changes the corresponding serving subband/BWP.

To reduce service disconnection due to a delay in radio link failure detection, a parameter/threshold/variable used in the typical radio link failure detection may be scaled considering the CO or RSSI level.

As an example, the CO or RSSI value may be divided into several sections (e.g., high, medium, and low), and the value to be added/subtracted/multiplied/divided may be determined for the relevant parameters for each section, and addition/subtraction/multiplication/division may be applied to the relevant parameters. As another example, the parameter values may be obtained considering the CO or RSSI value. As another example, the CO or RSSI value may be added/subtracted/multiplied/divided to the relevant parameter. For example, when the CO is 40, this indicates that the rate of samples in which the RSSI is higher than the threshold is 40%. If a threshold which has been reduced by 40% as compared with when the CO is 0 is applied, the corresponding parameter may be multiplied by (100%-40%). Or, when the CO is 20, this indicates that the rate of samples in which the RSSI is higher than the threshold is 40%. If a threshold which has been reduced by 20% as compared with when the CO is 0 is applied, the corresponding parameter may be multiplied by (100%-20%).

The above-described scaling operation may be applied likewise to one or more parameters of the maximum preamble transmission value used to detect a problem with the random access procedure, the maximum retransmission threshold used to detect the RLC issue, and the above-described counter threshold value and the above-described timer expiration value for detecting a channel access failure due to an LBT failure.

As described above, according to the embodiments of the disclosure, it is possible to efficiently and precisely detect a channel access failure due to an LBT failure that may arise in the UE in the connected state in NR-U, thereby reducing the service disconnection time.

Hereinafter, hardware and software configuration of a UE and base station capable of performing all or some of the above-described operations according to the embodiments will be briefly described again below with reference to the accompanying drawings.

Figure 11:
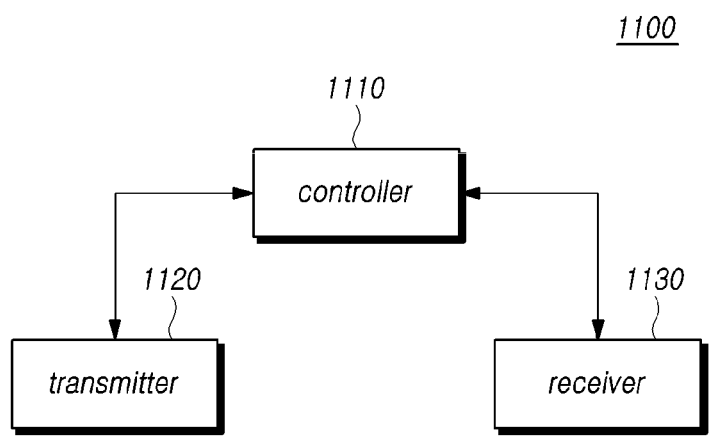
FIG. 11 is a block diagram illustrating a user equipment according to an embodiment.

FIG. 11 is a block diagram illustrating a UE according to an embodiment.

Referring to FIG. 11, a UE 1100 performing communication in an unlicensed band may include a controller 1110 that detects a channel occupancy failure for an unlicensed band radio resource for transmitting/receiving uplink data or downlink data and, when the channel occupancy failure meets a predetermined criterion, determines that it is the channel access failure for the unlicensed band radio resource and a transmitter 1120 that transmits higher layer signaling to a base station upon channel access failure.

The controller 1110 may perform the operation of a channel occupancy attempt for an unlicensed band radio resource to transmit uplink data to transmit uplink data in an unlicensed band. The channel occupancy failure in transmission of uplink data may include at least one of a failure to transmit a scheduling request message in an unlicensed band for transmission of uplink data, a failure to transmit a random access preamble, and a failure in uplink data channel transmission. That is, upon failing to transmit a PUSCH, a random access preamble, or a scheduling request message in the unlicensed band radio resource, the controller 1110 may determine that it is a failure to occupy the corresponding channel. The causes of transmission failure may include a channel occupancy attempt failure such as an LBT failure.

To receive downlink data in an unlicensed band, the controller 1110 may detect the channel occupancy failure by checking whether a reference signal transmitted in the unlicensed band radio resource is received. In this case, the channel occupancy attempt operation is performed by the base station and a reference signal is transmitted. The controller 1110 checks whether the reference signal is received and determines whether the base station has failed to occupy the corresponding channel. When the reference signal is not received, the controller 1110 may detect that the base station has failed to occupy the corresponding channel.

As an example, in the case of uplink, the controller 1110 may determine the channel access failure when the number of channel occupancy failures in the unlicensed band radio resource for uplink data transmission exceeds a threshold configured by the base station. That is, the controller 1110 may determine the channel access failure when consistent channel occupancy failures occur.

As another example, in the case of downlink, the controller 1110 determines the channel access failure when the number of channel occupancy failures in the unlicensed band radio resource for downlink data reception exceeds a threshold configured by the base station. However, in the case of downlink, the number of channel occupancy failures is counted based on the result of measurement of the reference signal transmitted from the base station, as described above.

As another example, the controller 1110 may determine that the channel access fails (e.g., the channel access failure) when the timer configured in association with channel occupancy failure in the unlicensed band radio resource expires or when the counter meets a threshold.

Upon determining that channel access fails for the unlicensed band radio resource, the transmitter 1120 transmits higher layer signaling to the base station to perform a processing operation according to the channel access failure.

For example, the higher layer signaling may include at least one information of channel occupancy information for the radio resource where channel access has failed, RSSI information, channel occupancy failure count information, channel occupancy failure ratio information, channel occupancy failure duration information, channel occupancy failure time information, channel occupancy failure period information, failure cause information, reporting cause information, information for the cell where channel access has failed, subband information, and bandwidth part information. Or, the higher layer signaling may be an RRC message, an SCG failure information message, or a failure information message.

As an example, if a channel access failure occurs in the PCell (Primary Cell), the transmitter 1120 transmits an RRC connection reconfiguration request message to the base station, thereby initiating an RRC connection reconfiguration procedure. As an example, if a channel access failure occurs in the PSCell (Primary SCell) or SCell (Secondary Cell), the transmitter 1120 transmits an SCG (Secondary Cell Group) failure information message or failure information message to the base station.

Upon receiving the higher layer signaling from the UE 1100, the base station may instruct the UE 1100 to hand over, reconfigure an RRC connection, or perform an operation, such as secondary cell change/release/addition. The receiver 1130 may receive the indication information from the base station. Or, the base station may change the unlicensed band radio resource where the channel access has failed. For example, the base station may instruct to change the bandwidth part or subband of the unlicensed band.

Besides, the controller 1110 controls the overall operation of the UE 1100 according to detecting a channel access failure due to a channel occupancy failure and initiating a procedure for addressing the same according to the above-described embodiments.

The transmitter 1120 and the receiver 1130 are used to transmit or receive signals or messages or data necessary for performing the above-described embodiments, with the base station.

Figure 12:
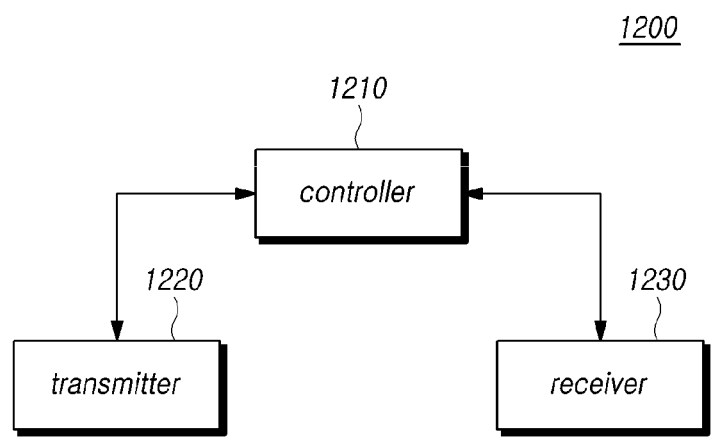
FIG. 12 is a block diagram illustrating a base station according to an embodiment.

FIG. 12 is a block diagram illustrating a base station according to an embodiment.

Referring to FIG. 12, a base station 1200 performing communication in an unlicensed band includes a transmitter 1220 that transmits information about at least one of a timer and a counter for determining a channel access failure to a UE, a controller 1210 that controls to monitor whether uplink data is received in an unlicensed band radio resource, and a receiver 1230 that receives higher layer signaling transmitted by a UE as the UE determines a channel access failure.

As described above, the UE may detect a channel occupancy failure for the unlicensed band radio resource. To that end, the transmitter 1220 may transmit at least one information of timer information and counter information used for the UE to determine a channel occupancy failure to the UE. The information for determining a channel occupancy failure may be transferred to the UE via system information, cell-specific signaling or UE-specific signaling.

Meanwhile, the transmitter 1220 may transmit radio resource allocation information for the UE to transmit uplink data using the unlicensed band radio resource. The UE may perform a channel occupancy attempt for the allocated unlicensed band radio resource and detect a channel occupancy failure. The receiver 1230 monitors whether uplink data is received in the unlicensed band radio resource allocated to the UE. If the UE fails to occupy channel in the corresponding radio resource, the base station 1200 may not receive uplink data. The UE may attempt channel occupancy via the above-described operations and may determine whether channel access fails.

Upon determining that channel access fails for the unlicensed band radio resource, the UE transmits higher layer signaling to the base station to perform a processing operation according to the channel access failure.

For example, the higher layer signaling may include at least one information of channel occupancy information for the radio resource where channel access has failed, RSSI information, channel occupancy failure count information, channel occupancy failure ratio information, channel occupancy failure duration information, channel occupancy failure time information, channel occupancy failure period information, failure cause information, reporting cause information, information for the cell where channel access has failed, subband information, and bandwidth part information. For example, the higher layer signaling received by the base station may be an RRC message, an SCG failure information message, or a failure information message.

As an example, if the UE's channel access failure occurs in the PCell (Primary Cell), the receiver 1230 receives an RRC connection reconfiguration request message, and the controller 1210 initiates an RRC connection reconfiguration procedure. As an example, if the UE's channel access failure occurs in the PSCell (Primary SCell) or SCell (Secondary Cell), the receiver 1230 receives an SCG (Secondary Cell Group) failure information message or failure information message.

Upon receiving the higher layer signaling from the UE, the controller 1210 may instruct the UE to hand over, reconfigure an RRC connection, or perform an operation, such as secondary cell change/release/addition. Or, the controller 1210 may change the unlicensed band radio resource where the channel access has failed. For example, the controller 1210 may instruct the UE to change the bandwidth part or subband of the unlicensed band.

Meanwhile, the transmitter 1220 may transmit a reference signal using the unlicensed band radio resource. To that end, the controller 1210 performs a channel occupancy attempt operation. When a predetermined period or a specific condition is met, the transmitter 1220 transmits a reference signal in an unlicensed band radio resource for downlink data transmission. However, as transmission of the reference signal also uses an unlicensed band radio resource, the controller 1210 performs a channel occupancy attempt operation in the radio resource for transmission of a reference signal before transmitting a reference signal. For example, the controller 1210 controls the LBT operation.

As described above, when the unlicensed band radio resource is congested or fails to meet a preset occupancy reference value, the controller 1210 detects a channel occupancy failure. Upon detecting the channel occupancy failure, the controller 1210 may again perform a channel occupancy attempt operation in the next time period.

Besides, the controller 1210 controls the overall operation of the base station 1200 according to initiating a procedure for addressing a channel access failure due to a channel occupancy failure when the UE detects the channel access failure.

The transmitter 1220 and the receiver 1230 are used to transmit or receive signals or messages or data necessary for performing the above-described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for a user equipment (UE) to perform communication in an unlicensed band, the method comprising:
   detecting a channel occupancy failure for an unlicensed band radio resource for transmitting uplink data;
   when the channel occupancy failure meets a predetermined criterion, determining that channel access fails for the unlicensed band radio resource; and
   upon the channel access failure, transmitting a higher layer signaling to a base station,
   wherein if the channel access failure occurs in a primary SCell (PSCell) or a secondary cell (SCell), the higher layer signaling is one of a secondary cell group (SCG) failure information message and a failure information message.

2. The method of claim 1, wherein determining that the channel access fails includes determining that the channel access fails when a number of channel occupancy failures in the unlicensed band radio resource for transmitting the uplink data is not less than a threshold configured by the base station.

3. The method of claim 2, wherein determining that the channel access fails includes calculating the number of channel occupancy failures by increasing a value of a counter associated with the channel occupancy failure if the channel occupancy failure in the unlicensed band radio resource for transmission of the uplink data is detected.

4. The method of claim 3, wherein the value of the counter is reset if a timer configured in association with the channel occupancy failure expires.

5. The method of claim 4, wherein the timer starts or restarts if the channel occupancy failure is detected.

6. The method of claim 1, wherein the channel occupancy failure is detected for each of one or more bandwidth parts configured of the unlicensed band radio resource.

7. The method of claim 6, further comprising, in a case where two or more of the bandwidth parts are configured, if one bandwidth part is determined to be the channel access failure, performing bandwidth part switching using another bandwidth part.

8. A method for a base station to perform communication in an unlicensed band, the method comprising:
   transmitting information about at least one of a timer and a counter used to determine a channel access failure to a UE;
   monitoring whether uplink data is received in an unlicensed band radio resource; and
   receiving a higher layer signaling transmitted as the UE determines that channel access fails,
   wherein if the UE's channel access failure occurs in a primary SCell (PSCell) or a secondary cell (SCell), the higher layer signaling is one of a secondary cell group (SCG) failure information message and a failure information message.

9. The method of claim 8, wherein the UE determines that the channel access fails when a number of channel occupancy failures in the unlicensed band radio resource for uplink data transmission is not less than a threshold.

10. The method of claim 9, wherein the UE calculates the number of channel occupancy failures by increasing a value of a counter associated with the channel occupancy failure if the channel occupancy failure in the unlicensed band radio resource for transmission of the uplink data is detected.

11. The method of claim 10, wherein the value of the counter is reset if a timer configured in association with the channel occupancy failure expires, and wherein the timer starts or restarts if the channel occupancy failure is detected.

12. A user equipment (UE) for performing communication in an unlicensed band, the UE comprising:
- a controller configured to detect a channel occupancy failure for an unlicensed band radio resource for transmitting uplink data and, when the channel occupancy failure meets a predetermined criterion, determining that channel access fails for the unlicensed band radio resource; and
- a transmitter transmitting a higher layer signaling to a base station upon the channel access failure,
- wherein if the channel access failure occurs in a primary SCell (PSCell) or a secondary cell (SCell), the higher layer signaling is one of a secondary cell group (SCG) failure information message and a failure information message.

13. The UE of claim 12, wherein the controller determines that the channel access fails when a number of channel occupancy failures in the unlicensed band radio resource for transmitting the uplink data is not less than a threshold configured by the base station.

14. The UE of claim 13, wherein the controller calculates the number of channel occupancy failures by increasing a value of a counter associated with the channel occupancy failure if the channel occupancy failure in the unlicensed band radio resource for transmission of the uplink data is detected.

15. The UE of claim 14, wherein the value of the counter is reset if a timer configured in association with the channel occupancy failure expires.

16. The UE of claim 15, wherein the timer starts or restarts if the channel occupancy failure is detected.

17. The UE of claim 12, wherein the controller detects the channel occupancy failure for each of one or more bandwidth parts configured of the unlicensed band radio resource.

18. The UE of claim 17, wherein in a case where two or more of the bandwidth parts are configured, if one bandwidth part is determined to be the channel access failure, the controller performs bandwidth part switching using another bandwidth part.

* * * * *